US008829909B2

(12) United States Patent
Tabarovsky

(10) Patent No.: US 8,829,909 B2
(45) Date of Patent: Sep. 9, 2014

(54) RESERVOIR NAVIGATION USING MAGNETIC FIELD OF DC CURRENTS

(75) Inventor: Leonty A. Tabarovsky, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 248 days.

(21) Appl. No.: 13/234,358

(22) Filed: Sep. 16, 2011

(65) Prior Publication Data

US 2012/0133368 A1 May 31, 2012

Related U.S. Application Data

(60) Provisional application No. 61/384,084, filed on Sep. 17, 2010.

(51) Int. Cl.
*G01V 3/04* (2006.01)
*G01V 3/26* (2006.01)
*E21B 47/09* (2012.01)

(52) U.S. Cl.
CPC ............. *G01V 3/26* (2013.01); *E21B 47/0905* (2013.01)
USPC ........................................................ 324/346

(58) Field of Classification Search
USPC ........................................................ 324/346
See application file for complete search history.

(56) References Cited

U.S. PATENT DOCUMENTS

| | | | |
|---|---|---|---|
| 4,003,017 A | 1/1977 | Bailey | |
| 4,460,059 A | 7/1984 | Katz | |
| 5,273,111 A | 12/1993 | Brannan et al. | |
| 5,485,089 A | 1/1996 | Kuckes | |
| 5,541,517 A | 7/1996 | Hartmann et al. | |
| 6,100,696 A | 8/2000 | Sinclair | |
| 6,662,872 B2 | 12/2003 | Gutek et al. | |
| 7,063,174 B2 | 6/2006 | Chemali et al. | |
| 7,714,585 B2 | 5/2010 | Nikitenko et al. | |
| 2003/0016020 A1 | 1/2003 | Gianzero | |
| 2003/0035639 A1 | 2/2003 | Okuno | |
| 2003/0051914 A1 | 3/2003 | Bittar | |
| 2006/0157277 A1 | 7/2006 | Bittar et al. | |
| 2006/0192562 A1 | 8/2006 | Davydychev et al. | |
| 2007/0126426 A1 | 6/2007 | Clark et al. | |
| 2007/0176842 A1 | 8/2007 | Brune et al. | |
| 2007/0256832 A1 | 11/2007 | Hagiwara et al. | |

(Continued)

FOREIGN PATENT DOCUMENTS

WO    WO2009073008 A1    6/2009

OTHER PUBLICATIONS

International Search Report and The Written Opinion of the International Searching Authority, or the Declaraton for International Application No. PCT/US2011/051919, received on May 2, 2012.

(Continued)

*Primary Examiner* — Reena Aurora
(74) *Attorney, Agent, or Firm* — Cantor Colburn LLP

(57) ABSTRACT

A method and apparatus for steering a drilling assembly within a reservoir of an earth formation is disclosed. The drilling assembly is positioned within the reservoir between a conductive upper layer having a DC magnetic field and a conductive lower layer having a DC magnetic field. A sensor of the drilling assembly measures a magnetic field in the reservoir resulting from the DC magnetic field of the conductive upper layer and the DC magnetic field of the conductive lower layer. A processor uses the measured magnetic field to steer the drilling assembly within the reservoir.

20 Claims, 3 Drawing Sheets

(56) References Cited

U.S. PATENT DOCUMENTS

2007/0278008 A1  12/2007  Kuckes et al.
2008/0041626 A1  2/2008  Clark
2008/0197851 A9  8/2008  Forgang et al.

OTHER PUBLICATIONS

Droujinina, Anna et al.; "Time-Lapse Crosswell Tomography in Athabasca Tar Sands," SEG Int'l Exposition and Annual Meeting, San Antonio, Texas, Sep. 9-14, 2001, 4 pages.

Restarick, Henry; "Horizontal Completion Options in Reservoirs with Sand Problems," SPE 29831, SPE Middle East Oil Show, Bahrain, Mar. 11-14, 1995, pp. 545-560.

8,829,909 B2

RESERVOIR NAVIGATION USING MAGNETIC FIELD OF DC CURRENTS

The present application claims priority from U.S. Provisional Application Ser. No. 61/384,084, filed Sep. 17, 2010.

BACKGROUND OF THE DISCLOSURE

1. Field of the Disclosure

The present disclosure provides methods and apparatus for navigating a drill string through a reservoir layer of an earth formation.

2. Description of the Related Art

Drilling apparatuses used in oil exploration make it possible to drill a borehole horizontally through an earth formation. Generally, horizontal drilling occurs in a formation layer that is of particular interest, such as a petroleum-bearing layer or reservoir. When drilling, it is desirable to maintain the drilling within the reservoir without straying into an adjacent formation layer. Fortunately, the adjacent formations typically have electromagnetic properties that differ from the properties of the reservoir and which may therefore be used for navigational purposes. For instance, the adjacent formations are typically conductive while the reservoir is not. The present invention provides a method and apparatus for navigating a reservoir using measurements of electromagnetic properties of formations.

SUMMARY OF THE DISCLOSURE

In one aspect, the present disclosure provide a method of steering a drilling assembly within a reservoir of an earth formation, including: positioning the drilling assembly within the reservoir between a conductive upper layer having a DC magnetic field and a conductive lower layer having a DC magnetic field; using a sensor to measure a magnetic field in the reservoir resulting from the DC magnetic field of the conductive upper layer and the DC magnetic field of the conductive lower layer; and steering the drilling assembly within the reservoir using the measured magnetic field.

In another aspect, the present disclosure provides an apparatus for steering a drilling assembly within a reservoir layer of an earth formation, the apparatus including: a sensor on the drilling assembly configured to measure a magnetic field in the reservoir resulting from a DC magnetic field at an upper formation layer above the reservoir and a DC magnetic field at a lower formation layer below the reservoir; and a processor configured to steer the drilling assembly within the reservoir using the measured magnetic field.

In yet another aspect, the present disclosure provides a drilling assembly that includes: a sensor on the drilling assembly configured to measure a magnetic field in the reservoir resulting from a DC magnetic field at an upper formation layer above the reservoir and a DC magnetic field at a lower formation layer below the reservoir; one or more stabilizers configured to change a direction of the drilling assembly; and a processor configured to operate the one or more stabilizers to steer the drilling assembly within the reservoir using the measured magnetic field.

Examples of certain features of the apparatus and method disclosed herein are summarized rather broadly in order that the detailed description thereof that follows may be better understood. There are, of course, additional features of the apparatus and method disclosed hereinafter that will form the subject of the claims.

BRIEF DESCRIPTION OF THE DRAWINGS

For detailed understanding of the present disclosure, references should be made to the following detailed description of the preferred embodiment, taken in conjunction with the accompanying drawings, in which like elements have been given like numerals and wherein.

DETAILED DESCRIPTION OF THE DISCLOSURE

Figure 1:
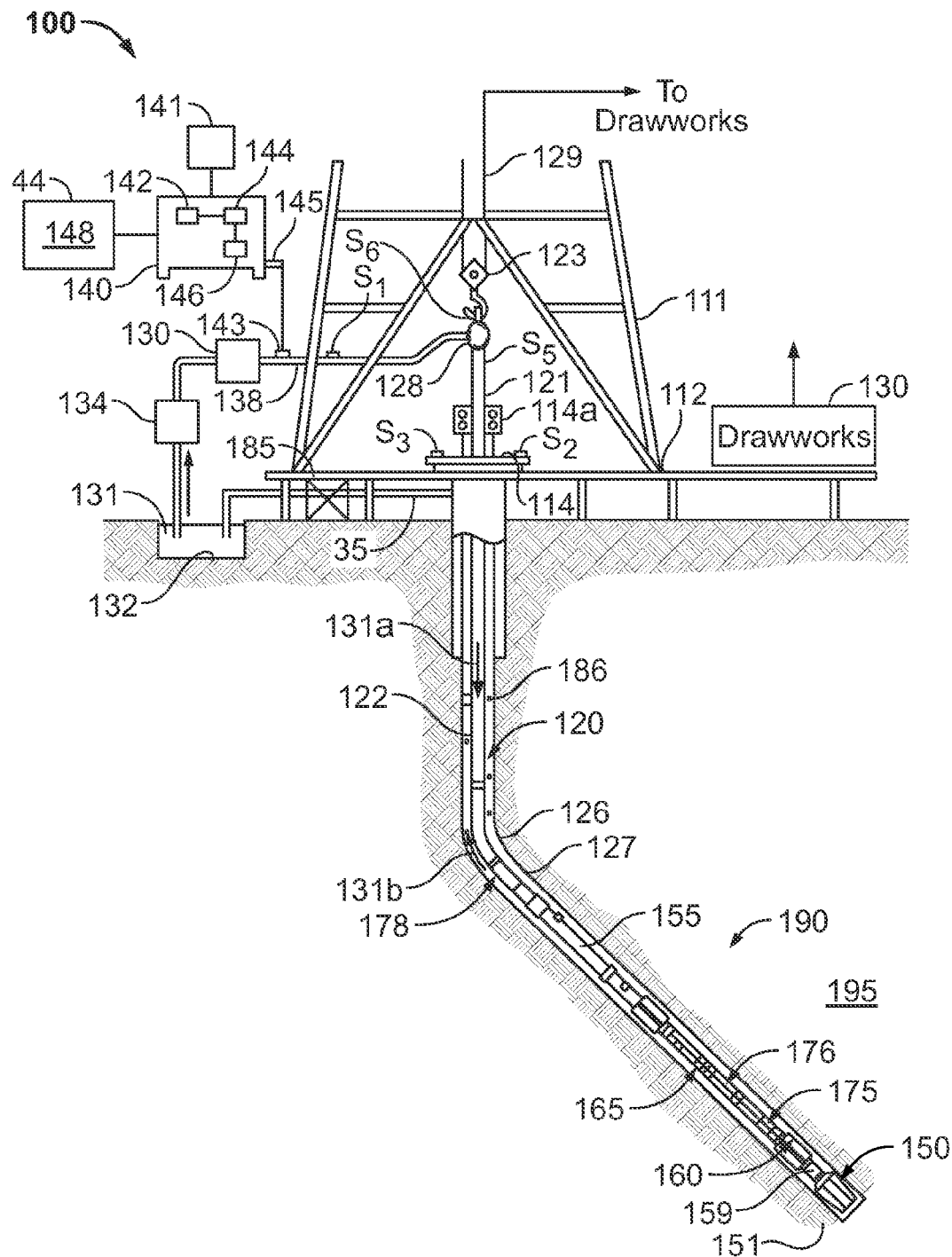
FIG. 1 is a schematic illustration of an exemplary drilling system suitable for using an apparatus made according to various embodiments of this disclosure for drilling boreholes according to the methods described herein.

FIG. 1 is a schematic diagram of an exemplary drilling system 100 that includes a drill string having a drilling assembly attached to its bottom end that includes a steering unit according to one embodiment of the disclosure. FIG. 1 shows a drill string 120 that includes a drilling assembly or bottomhole assembly ("BHA") 190 conveyed in a borehole 126. The drilling system 100 includes a conventional derrick 111 erected on a platform or floor 112 which supports a rotary table 114 that is rotated by a prime mover, such as an electric motor (not shown), at a desired rotational speed. A tubing (such as jointed drill pipe) 122, having the drilling assembly 190 attached at its bottom end extends from the surface to the bottom 151 of the borehole 126. A drill bit 150, attached to drilling assembly 190, disintegrates the geological formations when it is rotated to drill the borehole 126. The drill string 120 is coupled to a drawworks 130 via a Kelly joint 121, swivel 128 and line 129 through a pulley. Drawworks 130 is operated to control the weight on bit ("WOB"). The drill string 120 may be rotated by a top drive (not shown) instead of by the prime mover and the rotary table 114. The operation of the drawworks 130 is known in the art and is thus not described in detail herein.

In an aspect, a suitable drilling fluid 131 (also referred to as "mud") from a source 132 thereof, such as a mud pit, is circulated under pressure through the drill string 120 by a mud pump 134. The drilling fluid 131 passes from the mud pump 134 into the drill string 120 via a de-surger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor $S_1$ in line 138 provides information about the fluid flow rate. A surface torque sensor $S_2$ and a sensor $S_3$ associated with the drill string 120 provide information about the torque and the rotational speed of the drill string 120. Rate of penetration of the drill string 120 may be determined from the sensor $S_5$, while the sensor $S_6$ may provide the hook load of the drill string 120.

In some applications, the drill bit 150 is rotated by rotating the drill pipe 122. However, in other applications, a downhole motor 155 (mud motor) disposed in the drilling assembly 190 also rotates the drill bit 150. The rate of penetration ("ROP") for a given drill bit and BHA largely depends on the WOB or the thrust force on the drill bit 150 and its rotational speed.

A surface control unit or controller 140 receives signals from the downhole sensors and devices via a sensor 143 placed in the fluid line 138 and signals from sensors $S_1$-$S_6$ and other sensors used in the system 100 and processes such signals according to programmed instructions provided from a program to the surface control unit 140. The surface control unit 140 displays desired drilling parameters and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole and may control one or more operations of the downhole and surface devices.

Still referring to FIG. 1, the drill string 120 further includes energy conversion devices 160 and 178. In an aspect, the energy conversion device 160 is located in the BHA 190 to provide an electrical power or energy, such as current, to sensors 165 and/or communication devices 159. Energy conversion device 178 is located in the drill string 120 tubular, wherein the device provides current to distributed sensors located on the tubular. As depicted, the energy conversion devices 160 and 178 convert or harvest energy from pressure waves of drilling mud which are received by and flow through the drill string 120 and BHA 190. Thus, the energy conversion devices 160 and 178 utilize an active material to directly convert the received pressure waves into electrical energy. As depicted, the pressure pulses are generated at the surface by a modulator, such as a telemetry communication modulator, and/or as a result of drilling activity and maintenance. Accordingly, the energy conversion devices 160 and 178 provide a direct and continuous source of electrical energy to a plurality of locations downhole without power storage (battery) or an electrical connection to the surface.

The drilling assembly 190 also contains formation evaluation sensors or devices (also referred to as measurement-while-drilling, "MWD," or logging-while-drilling, "LWD," sensors) determining resistivity, density, porosity, permeability, acoustic properties, nuclear-magnetic resonance properties, corrosive properties of the fluids or formation downhole, salt or saline content, and other selected properties of the formation 195 surrounding the drilling assembly 190. Such sensors are generally known in the art and for convenience are generally denoted herein by numeral 165. In addition, the drilling assembly may include a conductivity sensor 175 for measuring a conductivity of a formation layer and a magnetic sensor 176 for measuring a DC magnetic field within a formation. In one aspect, the magnetic measurements and/or conductivity measurements may be used in steering the drilling assembly using the methods described herein. A detailed discussed of the exemplary drilling assembly 190 is provided below with respect to FIG. 2.

The drilling assembly 190 may further include a variety of other sensors and communication devices 159 for controlling and/or determining one or more functions and properties of the drilling assembly (such as velocity, vibration, bending moment, acceleration, oscillations, whirl, stick-slip, etc.) and drilling operating parameters, such as weight-on-bit, fluid flow rate, pressure, temperature, rate of penetration, azimuth, tool face, drill bit rotation, etc.

Figure 2:
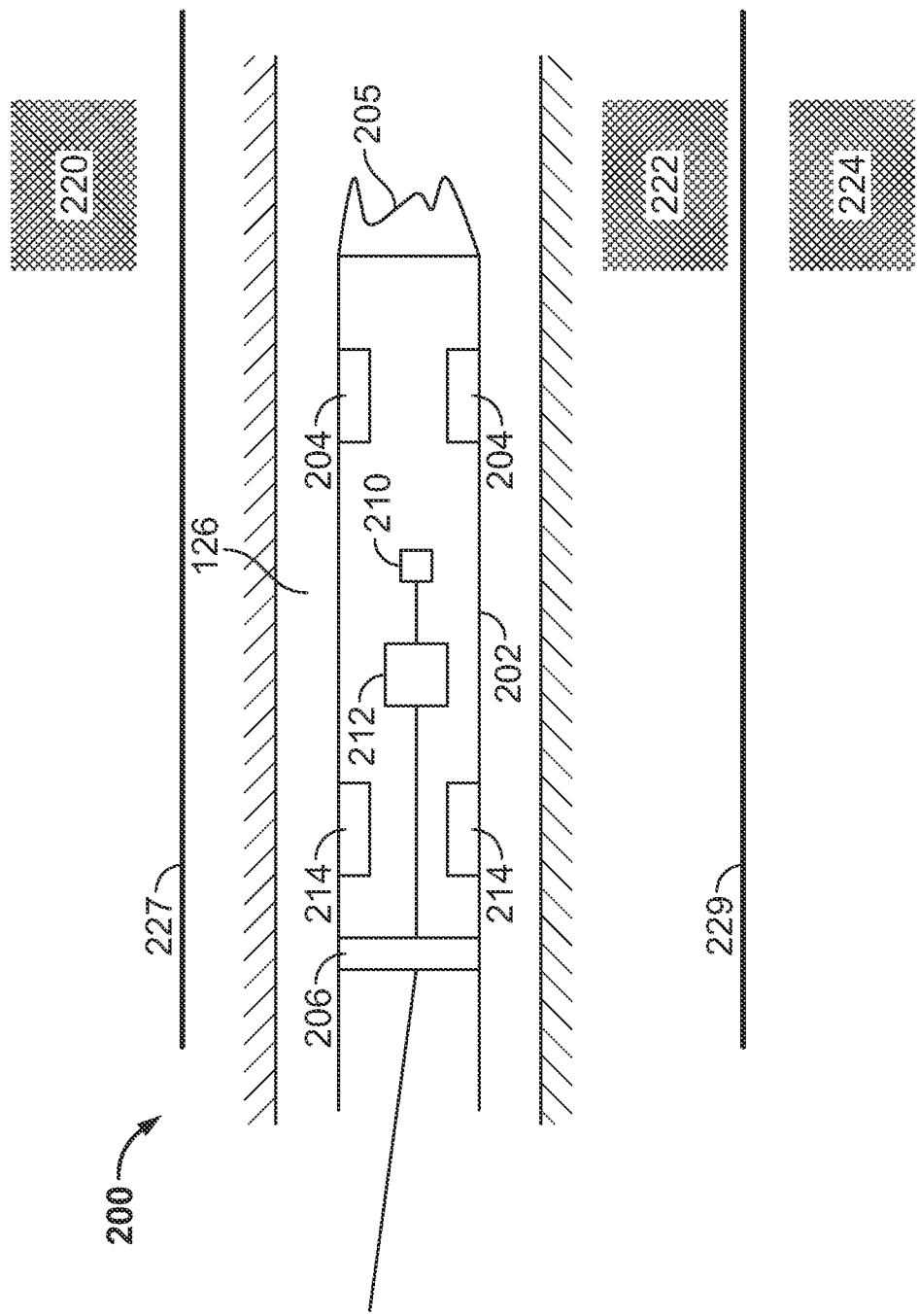
FIG. 2 shows an exemplary drilling assembly suitable for navigation through a reservoir using the methods described herein.

FIG. 2 shows an exemplary drilling assembly 202 of a drill string 200 for drilling a borehole 126 in a reservoir 222 and which may be steered through the reservoir using the methods describe herein. The drilling assembly 202 is located in reservoir 222 which is generally an oil-producing formation which is non-conductive. The reservoir 222 is bounded from above by an upper layer 220 and from below by a lower layer 224. Typically, upper layer 220 and lower layer 224 are conductive layers and the sign of the conductivity at one of the layers is opposite the sign of the conductivity at the other of the layers. First interface 227 is the interface between upper layer 220 and reservoir layer 222 and second interface 229 is the interface between reservoir layer 222 and lower layer 224. The upper layer 220 and lower layer 224 have DC magnetic fields associated with them which are parallel to first and second interfaces 227 and 229, respectively. The signs of the DC magnetic fields at the upper and lower layer are opposite to each other.

The exemplary drilling assembly 202 includes a drill bit 205 for drilling the reservoir 222 and stabilizers 204 which can be articulated from the drilling assembly 202 and which are suitable for changing a drilling direction of the drilling assembly 202. The drilling assembly 202 also includes one or more magnetic sensors 210 for obtaining magnetic measurements. The one or more sensors 210 are coupled to a processor 212 that determines a navigational instruction from the obtained magnetic measurements. The processor 212 is further coupled to the stabilizers 204 and provides the navigational instructions to the stabilizers to operating the stabilizers to affect the direction of the drilling assembly 202. The drilling assembly 202 may also include one or more conductivity sensors 214 for measuring a conductivity of a formation. The conductivity sensors 214 are coupled to processor 212 and provide conductivity measurements that may be used with the magnetic measurements in one aspect to steer the drilling assembly 202. A telemetry system 206 is located on the BHA 202 for providing data to a surface location. In an alternate embodiment, the processor may be located at the surface location and measurements are provided from the one or more sensors 210 and/or conductivity sensors 214 to the surface processor and steering instructions are provided from the surface processor to the stabilizers 204 via the telemetry unit 206.

In one aspect, the drilling assembly 202 navigates through reservoir 222 by measuring a magnetic field at the drilling assembly 202 resulting from the DC magnetic fields of the upper layer 220 and lower layer 224. Steering through the reservoir layer 222 is based on two features of the DC magnetic fields of the upper and lower layers 220 and 224. The first feature is that the DC magnetic field at an interface is parallel to the interface. The second feature is that the DC magnetic fields at each of the interfaces 227 and 229 have opposite signs. Thus, if the upper and lower half-spaces have equal conductivities, then the magnetic field at a central location of the reservoir between the interfaces 227 and 229 is equal to zero. Additionally, the measured magnetic field exhibits different signs when the drilling assembly 202 is approaching one of the upper layer 220 and the lower layer 224. These two features are discussed below after a brief discussion of the DC magnetic field at a single interface.

At a single interface, the magnetic field $\vec{H}^\mu$ is due to a distribution of galvanic current $\vec{j}$ and yields an x-component, wherein the x-direction is in an arbitrary direction in the plane of the interface. The Biot-Savart-Laplace's law yields the following equation:

$$H_x^\mu = \left(\vec{i}_x, \vec{H}^\mu\right) = \frac{1}{4\pi} \int_V \frac{\vec{i}_x \left[\vec{j} \times \vec{R}\right]}{R^3} dV = \frac{1}{4\pi} \int_V \vec{i}_x \left[\vec{j} \times grad \frac{1}{R}\right] dV \quad \text{Eq. (1)}$$

where $\vec{i}_x$ is the unit vector in the x-direction, $\vec{R}$ is a vector pointing from an integration point towards a field measurement point, and the gradient is with respect to the coordinates of the integration point. The volume of integration V includes the entire space. Applying a number of vector analysis rules yields:

$$H_x^\mu = \frac{1}{4\pi} \int_V [\vec{i}_x \times \vec{j}] \mathrm{grad} \frac{1}{R} dV \quad \text{Eq. (2)}$$

$$= \frac{1}{4\pi} \int_V \left\{ \mathrm{div} \frac{[\vec{i}_x \times \vec{j}]}{R} - \frac{1}{R} \mathrm{div}[\vec{i}_x \times \vec{j}] \right\} dV$$

$$= \frac{1}{4\pi} \int_V \left\{ \mathrm{div} \frac{[\vec{i}_x \times \vec{j}]}{R} + \frac{1}{R} \vec{i}_x \mathrm{curl} \vec{j} \right\} dV$$

$$= \frac{1}{4\pi} \vec{i}_x \int_{S_c} \frac{[(\vec{j}^- - \vec{j}^+) \times \vec{n}]}{R} dS + \frac{1}{4\pi} \vec{i}_x \int_V \frac{1}{R} \mathrm{curl} \vec{j} dV$$

where the surface $S_c$ includes the entire interface; $\vec{j}^-$, $\vec{j}^+$ indicate values of the current density on the opposite sides of the interface, $\vec{n}$ denotes a normal vector on the interface oriented from a region of negative current density to a region of positive current density. The volume integral on the last line in Eq. (2) vanishes because curl $\vec{j}=0$ for the galvanic current, thereby obtaining Eq. (3):

$$\vec{H}_x^\mu = \quad \text{Eq. (3)}$$

$$\frac{1}{4\pi} \vec{i}_x \int_{S_c} \frac{[(\vec{j}^- - \vec{j}^+) \times \vec{n}]}{R} dS = \frac{1}{4\pi} \vec{i}_x \int_{S_c} \frac{[(\sigma^- - \sigma^+)\vec{E}^\mu \times \vec{n}]}{R} dS$$

where, $\vec{E}^\mu$ is the electric field at the interface. Finally, the expression for the magnetic field takes the following form:

$$\vec{H}_x^\mu = \frac{1}{4\pi} \int_{S_c} \frac{[(\sigma^- - \sigma^+)\vec{E}^\mu \times \vec{n}]}{R} dS \quad \text{Eq. (4)}$$

where $\sigma^+$ and $\sigma^-$ are conductivities on opposing sides of an interface. Eq. (4) shows that the effect of a surface on the DC magnetic field depends only on the tangential components of the electric field at the interfaces.

Returning to the two features of the DC magnetic field introduced above, the first feature, that the DC magnetic field is parallel to the interface, is shown because the cross product, $[\vec{E}^\mu \times \vec{n}]$ is parallel to the plane, and, therefore, the entire integral of Eq. (4), i.e., magnetic field, $\vec{H}^\mu$, is parallel to the plane. The second feature, that if the upper and lower half-spaces have equal conductivities, then the magnetic field in the center of the layer is equal to zero, is discussed below. Two interfaces such as interfaces 227 and 229 are considered. Eq. (4) now takes the form of Eq. (5) below:

$$\vec{H}_x^\mu = \quad \text{Eq. (5)}$$

$$\frac{1}{4\pi} \int_{S_c^1} \frac{[(\sigma^1 - \sigma^+)\vec{E}_1^\mu \times \vec{n}^1]}{R_1} dS + \frac{1}{4\pi} \int_{S_c^2} \frac{[(\sigma^2 - \sigma^+)\vec{E}_2^\mu \times \vec{n}^2]}{R_2} dS$$

where, $\vec{E}_1^\mu$ and $\vec{E}_2^\mu$ are electric fields on the first (upper) interface 227 and second (lower) interface 229, respectively; $\vec{n}^1$ and $\vec{n}^2$ are the normal vectors for the first and second interfaces; $S_1^C$ and $S_2^C$ denote the surfaces of the first and second interfaces; $\sigma_1$ and $\sigma_2$ represent conductivities of the upper and lower formation layers 220 and 224; $\sigma^+$ is the conductivity of the reservoir 222; and $R_1$ and $R_2$ are the distances from respective first and second interfaces to a measurement point, i.e. the one or more sensors 210. The normal vectors at each interface point in opposite directions:

$$\vec{n}^1 = -\vec{n}^2 \quad \text{Eq. (6)}$$

For the case of $\sigma_1=\sigma_2$, Eq. (5) yields:

$$\vec{H}_x^\mu = \quad \text{Eq. (7)}$$

$$\frac{1}{4\pi} \int_{S_c^1} \frac{[(\sigma^1 - \sigma^+)\vec{E}_1^\mu \times \vec{n}^1]}{R_1} dS + \frac{1}{4\pi} \int_{S_c^2} \frac{[(\sigma^1 - \sigma^+)\vec{E}_2^\mu \times \vec{n}^2]}{R_2} dS$$

Due to Eq. (6), the two integral terms of Eq. (7) have opposite signs. Thus, at a central location, $\vec{E}_1^\mu=\vec{E}_2^\mu$ and $R_1=R_2$ for respective integration points and the two integral terms of Eq. (7) cancel each other. Therefore, the total magnetic field at the center of the reservoir 222 is substantially zero.

Therefore, in one aspect, a location in the reservoir between the upper and lower layers at which the measured DC magnetic field is substantially zero can be determined. In a particular case in which the conductivities of the upper layer and lower layer are equal and opposite, this determined location is the midpoint between the two layers. In another aspect the magnitude and sign of the measured magnetic field can be used to determine a distance between the measurement location and the zero location and therefore a distance between the measurement location and one of the upper and lower conductive layers. In another aspect, the magnetic fields can be used to steer the drill string through the reservoir. As the drill string approaches one interface, for instance the upper layer 220, the magnetic field increases in one direction, for instance, positively. As the drill string approaches the other interface, for instance the lower layer 224, the magnetic field increases negatively. Therefore, the magnitudes and signs of the measured magnetic fields can be used for steering. An exemplary method for navigating the drilling assembly through the reservoir layer is described in the discussion of FIG. 3.

Figure 3:
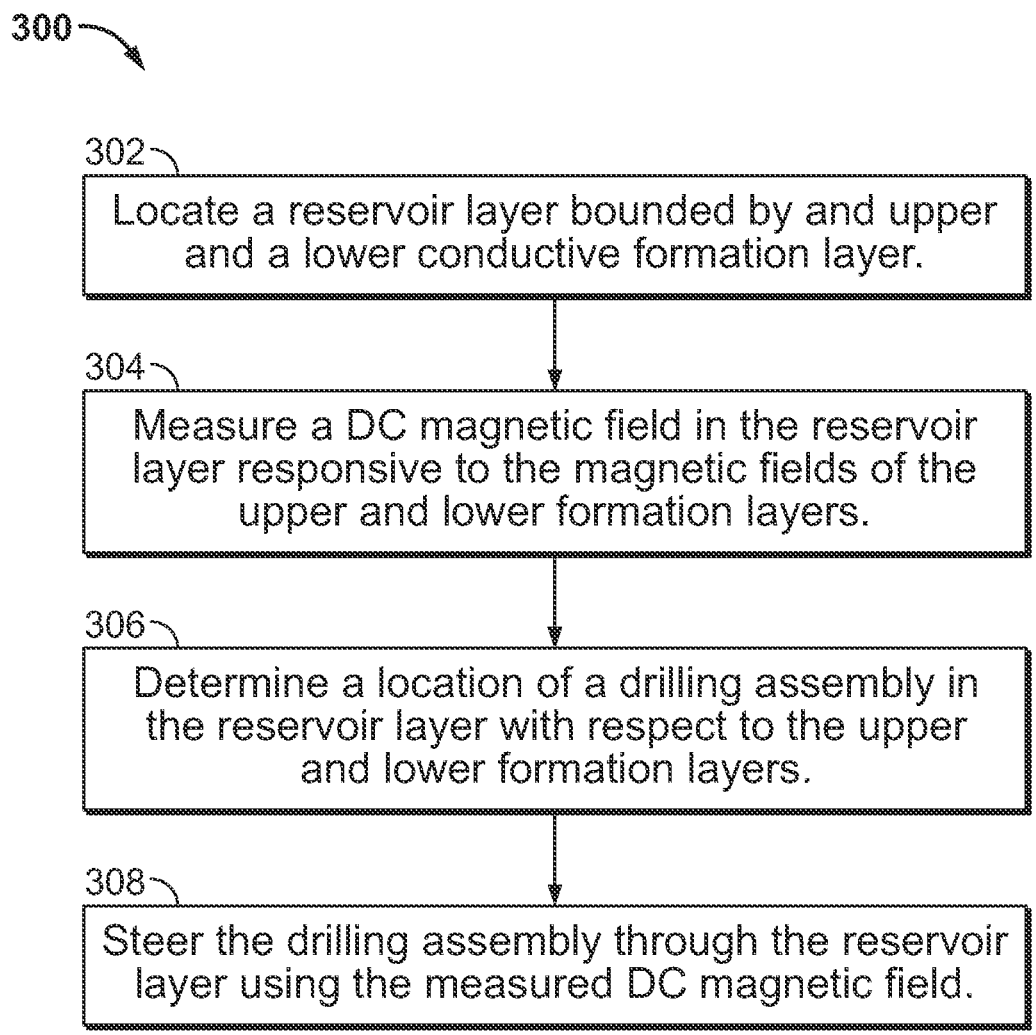
FIG. 3 shows a flowchart of an exemplary method for steering a drilling assembly through a reservoir.

FIG. 3 shows a flowchart 300 for an exemplary method of steering a drilling assembly 202 through a reservoir layer. In Box 302, an operator positions or locates the drilling assembly within the reservoir layer 222 bounded by upper and lower conductive formation layers 220 and 224. In Box 304, one or more sensors at the drilling assembly measure a magnetic field resulting from contributions of the DC magnetic fields at the upper and lower layers (220 and 224). In Box 306, the location of the drilling assembly with respect to the upper and lower formation layers is determined, and in Box 308, the drilling assembly is steered through the reservoir layer using the measured magnetic fields.

In one aspect, sensor measurements are calibrated to remove the effect of magnetic fields of the drilling assembly from the DC magnetic field measurements. Typically, various components of drilling assembly provide magnetic fields either for a particular purpose or as a result of currents such as for operation of the drilling assembly or injection into a surrounding formation. The effects of these fields can be removed by known calibration methods, such as measuring the magnetic fields in isolation prior to the drilling operation.

In another aspect, the conductivities of the upper layer 220 and lower layer 224 may be obtained using independent measurements such as electrical measurements or magnetic measurements, for example, at one of an electrical sensor and a magnetic sensor. These conductivities may be obtained prior to using the navigational methods described herein. For example, the conductivity of the upper formation layer 220 may be determined during drilling prior to the drilling assembly entering the reservoir layer 222. The conductivities may be further used to determine location of the drilling assembly within the reservoir and therefore to steer the drilling assembly.

Processing of the data may be done by a downhole processor to give corrected measurements substantially in real time. Implicit in the control and processing of the data is the use of a computer program on a suitable machine readable medium that enables the processor to perform the control and processing. The machine readable medium may include ROMs, EPROMs, EEPROMs, Flash Memories and Optical disks.

While the foregoing disclosure is directed to the preferred embodiments of the disclosure, various modifications will be apparent to those skilled in the art. It is intended that all variations within the scope and spirit of the appended claims be embraced by the foregoing disclosure.

Therefore, in one aspect, the present disclosure provide a method of steering a drilling assembly within a reservoir of an earth formation, including: positioning the drilling assembly within the reservoir between a conductive upper layer having a DC magnetic field and a conductive lower layer having a DC magnetic field; using a sensor to measure a magnetic field in the reservoir resulting from the DC magnetic field of the conductive upper layer and the DC magnetic field of the conductive lower layer; and steering the drilling assembly within the reservoir using the measured magnetic field. A location in the reservoir at which the measured magnetic field is substantially zero may be determined. Also, a distance of the drilling assembly to one of the upper and lower layers using the measured magnetic field may be determined. In one embodiment, a conductivity of the upper and lower conductive layers may be determined using at least one of an electrical measurement and a magnetic measurement. A location of the drilling assembly in the reservoir layer may be determined from the measurements of the conductivity of the upper conductive layer and lower conductive layer. The measurement of the magnetic field may be calibrated to remove contribution of a magnetic field of the drilling assembly to the magnetic field measurement.

In another aspect, the present disclosure provides an apparatus for steering a drilling assembly within a reservoir layer of an earth formation, the apparatus including: a sensor on the drilling assembly configured to measure a magnetic field in the reservoir resulting from a DC magnetic field at an upper formation layer above the reservoir and a DC magnetic field at a lower formation layer below the reservoir; and a processor configured to steer the drilling assembly within the reservoir using the measured magnetic field. In one embodiment, the processor is configured to determine a location in the reservoir at which the measured magnetic field is substantially zero. In another embodiment, the processor is configured to determine a distance of the drilling assembly to one of the upper and lower layers using the measured magnetic field. The apparatus may further include a sensor configured to determine a conductivity of the upper and lower conductive layers that may be an electrical sensor and/or a magnetic sensor. The processor may be configured to determine a location of the drilling assembly in the reservoir layer from the measurements of the conductivity of the upper conductive layer and lower conductive layer. In addition, the processor may be configured calibrate the measurement of the magnetic field to remove contribution of a magnetic field of the drilling assembly to the magnetic field measurement.

In yet another aspect, the present disclosure provides a drilling assembly that includes: a sensor on the drilling assembly configured to measure a magnetic field in the reservoir resulting from a DC magnetic field at an upper formation layer above the reservoir and a DC magnetic field at a lower formation layer below the reservoir; one or more stabilizers configured to change a direction of the drilling assembly; and a processor configured to operate the one or more stabilizers to steer the drilling assembly within the reservoir using the measured magnetic field. In one embodiment, the processor is configured to determine a location in the reservoir at which the measured magnetic field is substantially zero. In another embodiment, the processor is configured to determine a distance of the drilling assembly to one of the upper and lower layers using the measured magnetic field. The apparatus may further include a sensor configured to determine a conductivity of the upper and lower conductive layers. The processor may be configured to determine a location of the drilling assembly in the reservoir layer from the measurements of the conductivity of the upper conductive layer and lower conductive layer. In addition, the processor may be configured calibrate the measurement of the magnetic field to remove contribution of a magnetic field of the drilling assembly to the magnetic field measurement.

While the foregoing disclosure is directed to the preferred embodiments of the disclosure, various modifications will be apparent to those skilled in the art. It is intended that all variations within the scope and spirit of the appended claims be embraced by the foregoing disclosure.

What is claimed is:

1. A method of steering a drilling assembly within a reservoir of an earth formation, comprising:
    positioning the drilling assembly within the reservoir between a conductive upper layer having a direct current magnetic field and a conductive lower layer having a direct current magnetic field;
    using a sensor to measure a magnetic field in the reservoir resulting from the direct current magnetic field of the conductive upper layer and the direct current magnetic field of the conductive lower layer; and
    steering the drilling assembly within the reservoir using the measured magnetic field.

2. The method of claim 1 further comprising determining a location in the reservoir at which the measured magnetic field is substantially zero.

3. The method of claim 1 further comprising determining a distance of the drilling assembly to one of the upper and lower layers using the measured magnetic field.

4. The method of claim 1 further comprising determining a conductivity of the upper and lower conductive layers.

5. The method of claim 4 further comprising determining the conductivities using one of: (i) an electrical measurement; and (ii) a magnetic measurement.

6. The method of claim 4 further comprising determining a location of the drilling assembly in the reservoir layer from the measurements of the conductivity of the upper conductive layer and lower conductive layer.

7. The method of claim 1 further comprising calibrating the measurement of the magnetic field to remove contribution of a magnetic field of the drilling assembly to the magnetic field measurement.

8. An apparatus for steering a drilling assembly within a reservoir layer of an earth formation, comprising:
 a sensor on the drilling assembly configured to measure a magnetic field in the reservoir resulting from a direct current magnetic field at an upper formation layer above the reservoir and a direct current magnetic field at a lower formation layer below the reservoir; and
 a processor configured to steer the drilling assembly within the reservoir using the measured magnetic field.

9. The apparatus of claim 8, wherein the processor is further configured to determine a location in the reservoir at which the measured magnetic field is substantially zero.

10. The apparatus of claim 8, wherein the processor is further configured to determine a distance of the drilling assembly to one of the upper and lower layers using the measured magnetic field.

11. The apparatus of claim 8 further comprising a sensor configured to determine a conductivity of the upper and lower conductive layers.

12. The apparatus of claim 11, wherein the sensor is one of: (i) an electrical sensor; and (ii) a magnetic sensor.

13. The apparatus of claim 11, wherein the processor is further configured determine a location of the drilling assembly in the reservoir layer from the measurements of the conductivity of the upper conductive layer and lower conductive layer.

14. The apparatus of claim 8, wherein the processor is further configured calibrate the measurement of the magnetic field to remove contribution of a magnetic field of the drilling assembly to the magnetic field measurement.

15. A drilling assembly, comprising:
 a sensor on the drilling assembly configured to measure a magnetic field in the reservoir resulting from a direct current magnetic field at an upper formation layer above the reservoir and a direct current magnetic field at a lower formation layer below the reservoir;
 one or more stabilizers configured to change a direction of the drilling assembly; and
 a processor configured to operate the one or more stabilizers to steer the drilling assembly within the reservoir using the measured magnetic field.

16. The drilling assembly of claim 15, wherein the processor is further configured to determine a location in the reservoir at which the measured magnetic field is substantially zero.

17. The drilling assembly of claim 15, wherein the processor is further configured to determine a distance of the drilling assembly to one of the upper and lower layers using the measured magnetic field.

18. The drilling assembly of claim 15 further comprising a sensor configured to determine a conductivity of the upper and lower conductive layers.

19. The drilling assembly of claim 18, wherein the processor is further configured to determine a location of the drilling assembly in the reservoir layer from the measurements of the conductivity of the upper conductive layer and lower conductive layer.

20. The drilling assembly of claim 15, wherein the processor is further configured to calibrate the measurement of the magnetic field to remove contribution of a magnetic field of the drilling assembly to the magnetic field measurement.

* * * * *